United States Patent Office 2,837,858
Patented June 10, 1958

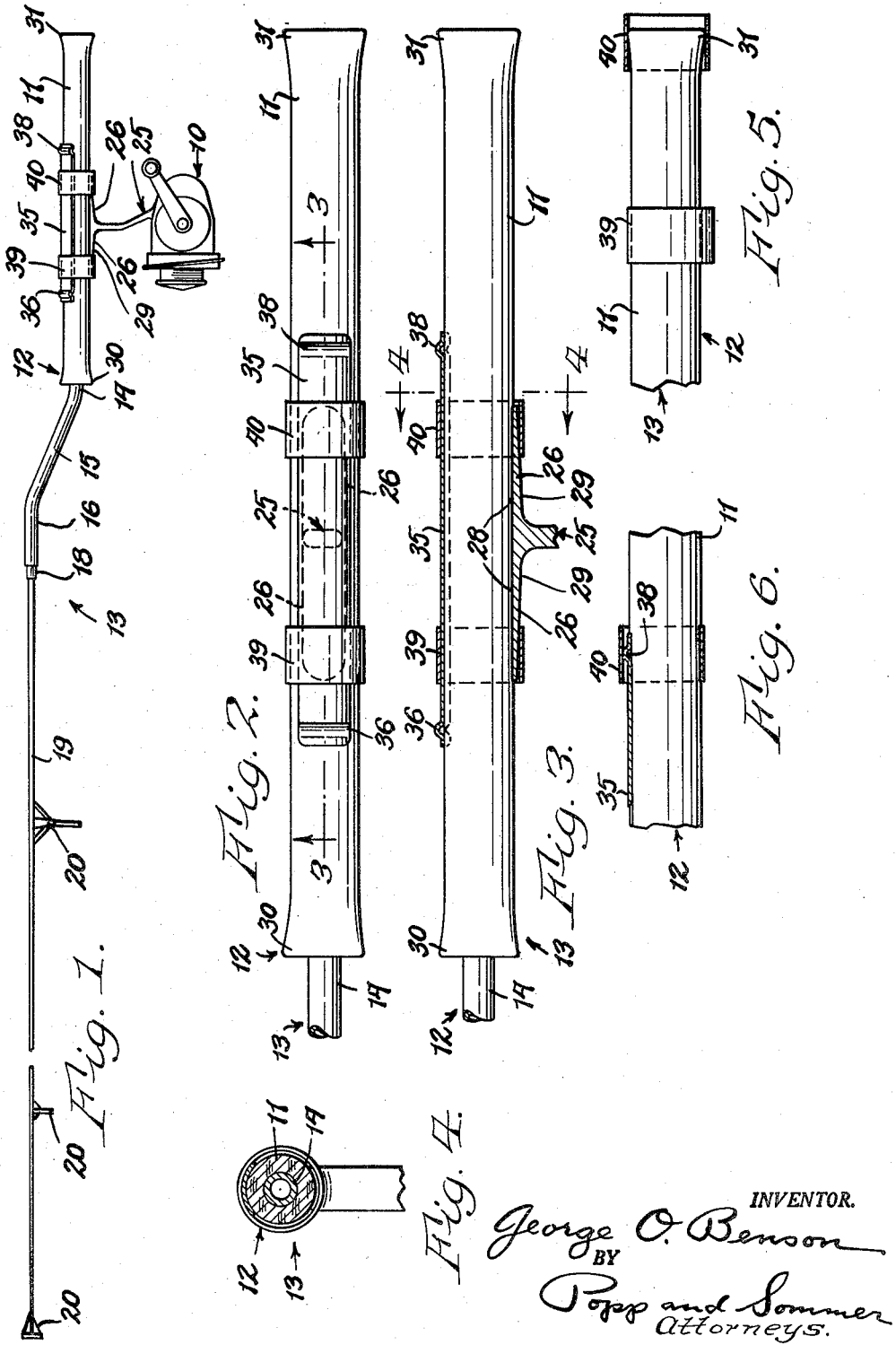

2,837,858

HOLDER FOR ATTACHING A REEL TO THE CORK GRIP OF A FISHING POLE

George O. Benson, Youngstown, N. Y., assignor to Chisholm-Ryder Co., Inc., Niagara Falls, N. Y., a corporation of New York Application August 3, 1954, Serial No. 447,503

3 Claims. (Cl. 43—22)

This invention relates to a holder for attaching a reel to the cork grip of a fishing pole, and more particularly to such a holder designed for use with low cost fishing poles and which is at the same time fully serviceable in use.

It is accordingly one of the principal objects of the present invention to provide a very simple and low cost holder for this purpose and which at the same time can be readily used without danger of diggin into and scarring the cork handle, and reliably holds the reel in fixed relation to the grip.

Another important object is to provide a holder which can readily be assembled on the cork grip and all parts of which are retained on the cork grip even after the reel has been removed, thereby to avoid danger of loss of any of such parts.

Another object of the present invention is to provide such a holder which permits of locating the reel in any desired position lengthwise of the cork grip or in any desired position angularly around the grip. This is particularly important where the handle includes a laterally offset portion in which the fishing rod is secured.

Another object is to provide such a holder which is neat and attractive in appearance and which will stand up under conditions of severe and constant outdoor use without getting out of order or requiring repairs.

Other objects and advantages of the invention will be apparent from the following description and drawings in which:

Fig. 1 is a fragmentary side elevational view of a fishing pole having a cork grip to which a conventional spinning reel is attached by a holder embodying present invention, the reel being of the open spool type permitting the fishing line to leave in large loops.

Fig. 2 is an enlarged fragmentary view similar to Fig. 1 but looking downwardly from the top of Fig. 1.

Fig. 3 is a fragmentary longitudinal section taken vertically on line 3—3, Fig. 2.

Fig. 4 is a fragmentary transverse section taken on line 4—4, Fig. 3.

Fig. 5 is a fragmentary view similar to Figs. 2 and 3 and showing the manner in which the attached rings can be removed from the cork handle.

Fig. 6 is a fragmentary view similar to Fig. 3 and showing the manner in which the attached rings can be removed from the slide plate which forms a part of the holder.

The holder forming the subject of the present invention is designed to secure a reel 10 to the cork grip 11 of the handle 12 of a fishing pole 13. The handle 12 is shown as including a tubular metal shank 14 which fits within and can be adhesively secured in a longitudinal bore (not shown) in the cork grip 11. This shank 14 is also shown as having a laterally bent portion 15 terminating in an open ended tubular offset portion 16, this offset portion being shown as being parallel with the cork grip 11.

In the open end of the tubular offset portion 16 is inserted the enlarged end 18 of a tapered fishing rod 19, this rod having the usual eyes 20, or guides; the fishing rod 19 through its connecting part 18 is removable from the open end of the tubular offset 16 and this rod 19 can also, if desirable, be turned to any desired rotative position with reference to the handle. This is particularly related to the laterally bent portion 15 of the handle and which permits the pole to be used both with the open spool type of reel shown from which the fishing line leaves in large loops as well as with a closed type spinning reel (not shown) in which the line issues through a small hole in a cap covering the spool. This feature forms no part of the present invention, except as illustrating the desirability of being able to mount the reel on one side or the opposite side of the cork grip 11 depending upon which type of reel is used.

With the reel 10 shown it is mounted on the side of the cork grip 11 opposite the direction of projection of the offset portion 15 and the fishing pole 10 is arranged so that its eyes or guides 20 are arranged on the same side of the fishing pole as the reel.

Either type of reel has a base 25 including a pair of tapering ears 26 which extend in opposite directions with reference to each other and jointly have a curved or semicircular face 28 which fits the cork grip 11. The opposite or outer faces 29 of these tapering ears 26 are also preferably curved transversely so as to generally conform in curvature to the face 28, but these faces 29 taper so that the radial thickness of the ears diminishes toward the extremities of these ears, as best shown in Fig. 3.

The form of the cork grip 11 also enters into the invention. As shown the cork grip 11 is of generally cylindrical form but has an enlarging or radially extending annular bead or enlargement 30 at its pole end and has a similar radially extending enlargement or bead 31 at its butt end.

The holder embodying the present invention comprises a metal slide plate 35 which is of elongated form so as to substantially exceed the length of the ears 26 of the reel 10. This plate is desirably made of sheet metal of a composition or plated so as to resist rusting and is transversely curved to conform to the cylindrical central portion of the cork grip 11. An important feature resides in the provision of an outwardly projecting transverse bead 36, 38 at each opposite end of the slide plate 35. Desirably these beads are provided by merely offsetting the metal and these beads preferably curve to conform to the cylindrical form of the cork grip 11.

The holder also includes a pair of rings 39, 40. These rings 39, 40 are also preferably made of sheet metal and are of endless tubular form, that is, each is in the form of a one piece continuous ring of cylindrical form and having the substantial axial length as shown.

An important feature of the invention resides in readily assembling the holder of the present invention on the cork grip 11. To effect such assembly the cylindrical sheet metal rings 39 and 40 are first forced over one or the other of the beads or circular radial enlargements 30 or 31 of the cork grip 11. Being made of cork the grip is, of course, readily compressed to a small degree and by the rounding form of these radial enlargements or beads 30, 31 of the handle it is possible to force the rings 39 and 40 over the enlargements or beads 30, 31 without injury to the cork grip 11, the cork of these beads or enlargements 30, 31 merely compressing the small amount necessary to permit the rings to pass. The forcing of these rings onto the cork grip is illustrated in Fig. 5.

Thereafter the rings 39 and 40 are severally separated toward the opposite ends of the cork grip 11. The slide plate 35 is then fitted against the cork grip 11 between them.

One beaded end of the slide plate 35, say, its bead 38 is then pressed inwardly so that this end is partly embedded in the relatively soft cork grip 11. When so embedded the corresponding ring 40 can be passed over this bead as illustrated in Fig. 6 and so as to slidingly embrace the central part of the slide plate 35, as best shown in Fig. 3. The other bead end 36 is then similarly pressed into the cork of the grip 11 and the other ring 39 moved axially over this bead so that both rings 39 and 40 slidingly embrace the central part of the slide plate 35 as shown in Fig. 3.

It will be observed that in this condition all of the parts are held together. Thus the slide plate 35 cannot slide over either end of the cork grip 11 because its radial enlargements or beads 30, 31 prevent such movement. Also neither of the rings 39 or 40 can escape from the central part of the slide plate 35 because the beads 36, 38 prevent such escape. The parts can be disassembled only by a reversal of the intentional distortion of the cork grip as previously described.

It will also be observed that the slide plate 35 and its rings 39 and 40 are relatively loose with respect to one another and also with respect to the cork grip 11. Accordingly, the slide plate and rings can be moved to any desired position lengthwise along the cork grip 11 and the slide plate 35 can be rotatively positioned anywhere around the grip. This position of the slide plate must be on the side of the grip 11 opposite the reel 10 but, as indicated above, it is desirable to mount one type of reel on the side toward which the bent portion 15 of the handle is offset and to mount another type of reel on the opposite side of the grip.

To mount either type of reel the rings 39 and 40 are moved to be severally positioned closed to the beads 36, 38. The ears 29 of the reel 10 are then fitted against the side of the cork grip 11 opposite the slide plate 35. The rings 39, 40 are then moved toward each other, sliding along the metal faces of the slide plate 35 and the ears 29 without injury to the soft cork grip 11. In riding upon the tapers of the ears 29 these rings draw these ears and the slide plate 35 into compressive relation with the cork grip 11 so as to reliably secure the reel to the cork grip.

It will be seen that the holder of the present invention is designed for use with a fishing pole having a manually compressible generally cylindrical cork grip 11 and which grip has a radially extending enlargement 31 at at least its butt end. It will also be seen that the holder is designed for use with a reel provided with tapered attaching ears 26, which extend in opposite directions along and in engagement with the cork grip and with the taper of said ears decreasing their effective thickness with reference to the axis of the cork grip toward the remote ends thereof. It will further be seen that the holder of the present invention essentially secures such ears of such a reel compressively to such cork grip and comprises the pair of endless tubular sheet metal rings 39, 40, the internal diameters of which are greater than the external diameter of the central part of the cork grip and less than the cross-sectional dimension of the cork grip at its enlargement 31, whereby said enlargement must be compressed to force the rings endwise over this enlargement and onto the central part of the cork grip. The holder also requires the metal slide plate 35 fitted longitudinally against the central part of the cork grip and having a radially outwardly extending enlargement 36, 38 at at least one end. The holder also requires that the internal diameter of the rings 39, 40 be greater than the combined cross-sectional dimension of the central parts of the grip 11 and slide plate 35 but less than the combined cross-sectional dimension of the enlargement 36 or 38 of the slide plate 35 and the central part of the cork grip 11 so that the beaded end of the slide plate must be compressed into the cork grip to permit the rings on the central part of the cork grip to pass endwise over the bead 36 or 38 and onto the central part of the slide plate.

From the foregoing it will be seen that the present invention provides a very low cost holder for attaching a fishing reel to the cork handle of a fishing pole, which holder can be easily assembled and when once assembled is not subject to loss of any of its parts and which can be used to reliably secure the reel in position.

I claim:

1. In a fishing pole having a manually compressible generally cylindrical cork grip with a radially extending compressible cork enlargement at at least the butt end of said cork grip and said fishing pole also having a reel provided with tapered attaching ears, extending in opposite directions, relative to each other, along and in engagement with said cork grip and with the taper of said ears decreasing their effective thickness with reference to the axis of said cork grip, toward the remote ends thereof; the combination therewith of a holder for securing said ears of said reel compressively to said cork grip, comprising a pair of endless tubular sheet metal rings the internal diameters of which are greater than the external diameter of the central part of said cork grip and slightly less than the maximum cross-sectional dimension of said cork grip at its said enlargement, the size of said maximum cross sectional dimension of said cork grip at said enlargement being such that said rings can be forced manually over said enlargement but said enlargement must be compressed to so force said rings over said enlargement and onto the central part of said cork grip, and a metal slide plate fitted longitudinally directly against one side only of said central part of said cork grip and having a radially outwardly extending enlargement at at least one end, the internal diameters of said rings being severally greater than the combined cross-sectional dimensions of the central parts of said slide plate and cork grip but slightly less than the combined cross-sectional dimension of said enlargement of said slide plate and the central part of said cork grip whereby the end of said slide plate having said last enlargement must be compressed into said cork grip to permit the rings on said central part of said grip to pass endwise over said last enlargement and onto the central part of said slide plate.

2. A holder as set forth in claim 1, wherein two of said last enlargements are provided on said slide plate, one at each end of said slide plate.

3. A holder as set forth in claim 1, wherein two compressible cork enlargements of said cork grip are provided, one at each end of said cork grip.

References Cited in the file of this patent

UNITED STATES PATENTS

| | | |
|---|---|---|
| 426,616 | Goggin | Apr. 29, 1890 |

FOREIGN PATENTS

| | | |
|---|---|---|
| 21,335 | Great Britain | July 28, 1910 |
| 254,172 | Switzerland | Dec. 1, 1948 |
| 926,448 | France | Oct. 1, 1947 |
| 958,259 | France | Mar. 6, 1950 |